(12) United States Patent
Slone et al.

(10) Patent No.: US 6,640,551 B1
(45) Date of Patent: Nov. 4, 2003

(54) THERMAL CONDITIONING BEVERAGE CONTAINER HOLDER

(75) Inventors: Carolyn L. Slone, St. Joseph, MI (US); Steven J. Kuehl, Stevensville, MI (US); Marcus Fischer, Stevensville, MI (US); Tyree Sampson, Columbus, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/064,870

(22) Filed: Aug. 26, 2002

(51) Int. Cl.[7] ............................................... F25B 21/02

(52) U.S. Cl. ...................... 62/3.61; 62/244; 62/457.4

(58) Field of Search ......................... 62/3.2, 3.61, 3.62, 62/244, 457.4, 457.5

(56) References Cited

U.S. PATENT DOCUMENTS

| 4,681,611 | A | * | 7/1987 | Bohner ..................... 62/3.64 |
| 5,029,446 | A | * | 7/1991 | Suzuki ...................... 62/3.6 |
| 6,065,303 | A | * | 5/2000 | Harris ..................... 62/457.5 |
| 6,067,816 | A | * | 5/2000 | Hodosh ................... 62/457.4 |
| 6,141,975 | A | * | 11/2000 | Tatsumi ...................... 62/62 |
| 6,446,460 | B1 | * | 9/2002 | Rosenberg .............. 62/457.3 |
| 6,446,461 | B1 | * | 9/2002 | Williams, Jr. ........... 62/457.5 |
| 6,449,958 | B1 | * | 9/2002 | Foye .......................... 62/3.2 |

* cited by examiner

*Primary Examiner*—William E. Tapolcai
(74) *Attorney, Agent, or Firm*—Stephen Krefman; Robert O. Rice; John F. Colligan

(57) ABSTRACT

A beverage container holder that is adjustable to accommodate various sizes of beverage containers, including containers of different heights and diameters for both tapered-wall containers and straight-wall containers. The beverage container includes a convection air flow generator for supplying conditioned air around the beverage.

41 Claims, 10 Drawing Sheets

THERMAL CONDITIONING BEVERAGE CONTAINER HOLDER

BACKGROUND OF THE INVENTION

1. Field of the Invention

The invention relates to a beverage container holder. In one aspect, the invention relates to a beverage container holder that is size-adjustable to accommodate varying sizes of beverage containers. In another aspect, the invention relates to a beverage container holder that thermally conditions the air surrounding the beverage container to control the temperature of the beverage within the beverage container.

2. Description of the Related Art

Most contemporary vehicles (cars, trucks, boats, etc.) are usually accessorized with a cup holder. Such cup holders are sized to receive cups or beverage containers for both hot and cold beverages. Some cup holders are size-adjustable to accommodate cups of varying diameters while still snugly retaining the cup and thereby preventing the tipping or spilling of the cup during the normal operation of the vehicle.

It is becoming more difficult for a single cup holder to accommodate all of the various standard cup sizes, especially since the largest cup sizes for cold beverages is generally 44 ounces and larger, while the largest cup size for hot beverages is generally 20 ounces or less. The problem of accommodating all cup sizes is exacerbated by what appears to be an ever increasing largest cup size for cold beverages.

Current cup holders are also not configured to accommodate bottles and other beverage containers that have generally straight side walls, unlike the tapered side walls found on most cups. With the recent increase in the popularity of water and sports drinks that come in straight-walled bottles, it is now important for a cup holder to accommodate the generally taller and straight sidewall shape of bottles in addition to accommodating the traditional tapered cup.

One feature almost all cup holders currently lack is the ability to control the temperature of the beverage in the beverage container, regardless whether the container is a cup or a bottle and whether the beverage is a hot or cold beverage. The need to control the temperature of the beverage becomes more important as people spend greater amounts of time in their vehicles, especially cars and trucks.

There is a need for a cup holder that addresses all of the disadvantages found in contemporary cup holders. The cup holder should accommodate beverage containers of all shapes and sizes, both in height and circumference, and control the temperature of the beverage.

SUMMARY OF INVENTION

The invention addresses the shortcomings of prior art cup holders and relates to a thermal conditioning beverage container holder for holding all types of beverage containers while controlling the temperature of the beverage in the beverage container. The beverage container holder according to the invention comprises a housing defining a chamber sized to receive a beverage container and having an access opening permitting access to the chamber through the housing. A convection airflow generator is fluidly coupled to the chamber and delivers thermally conditioned air to the chamber to control the temperature of the beverage within a beverage container placed in the chamber. The beverage container holder includes a size-adjustable structure to enable the supporting of cups of differing sizes.

The thermal conditioning beverage container holder can further include a movable cover for selectively closing the access opening. The movable cover preferably comprises multiple segments that telescopically nest when opened.

The size adjustable structure can comprise a resizing element used to resize the container holder to accommodate containers of differing diameter and/or height. One such resizing element is a beverage container support located within the chamber and sized to support a bottom portion of the beverage container, with a first recess for receiving the bottom of the beverage container up to a first maximum diameter. A second recess, greater in size than the first recess, can be provided for receiving the bottom of a beverage container of a second maximum diameter that is larger in size than the first maximum diameter.

The resizing element can also comprise a plate in which is formed an opening for receiving a beverage container and which is movable between a first position, where the plate overlies the chamber to reduce the effective cross-sectional area of the chamber, and a second position, where the plate is withdrawn from the overlying position relative to the chamber. The plate is preferably spaced above the beverage container support when the plate is in the first position.

The convection airflow generator comprises a thermal conditioner for conditioning the temperature of the air in the chamber by introducing conditioned air into the chamber by convection. The thermal conditioner includes a blower introducing conditioned air through the chamber. The thermal conditioner can be a thermoelectric device in combination with a fan.

In another embodiment, the invention relates to a reclosable cup holder comprising a housing defining a cup-receiving chamber having an access opening through which a cup can be inserted or removed. A cup holder is located within the chamber for supporting a cup placed within the chamber. A see-through cover is movably mounted to the housing for movement between a closed position, where the cover closes the access opening, and an opened position, where the cover is removed from the access opening. The movable cover preferably comprises multiple segments that telescopically nest when opened.

In yet another embodiment, the invention relates to a method for controlling the temperature of a beverage held by a beverage container temporarily stored in a size-adjustable beverage holder located within a chamber of a housing in a motor vehicle. The method comprises adjusting the size of the size-adjustable beverage holder to accommodate the beverage container to be placed in the chamber; placing the beverage container in the size-adjustable beverage holder; and introducing thermally conditioned air into the chamber to control the temperature of the beverage in the beverage container at a temperature above or below the ambient air temperature within the vehicle interior.

DETAILED DESCRIPTION

Figure 1:
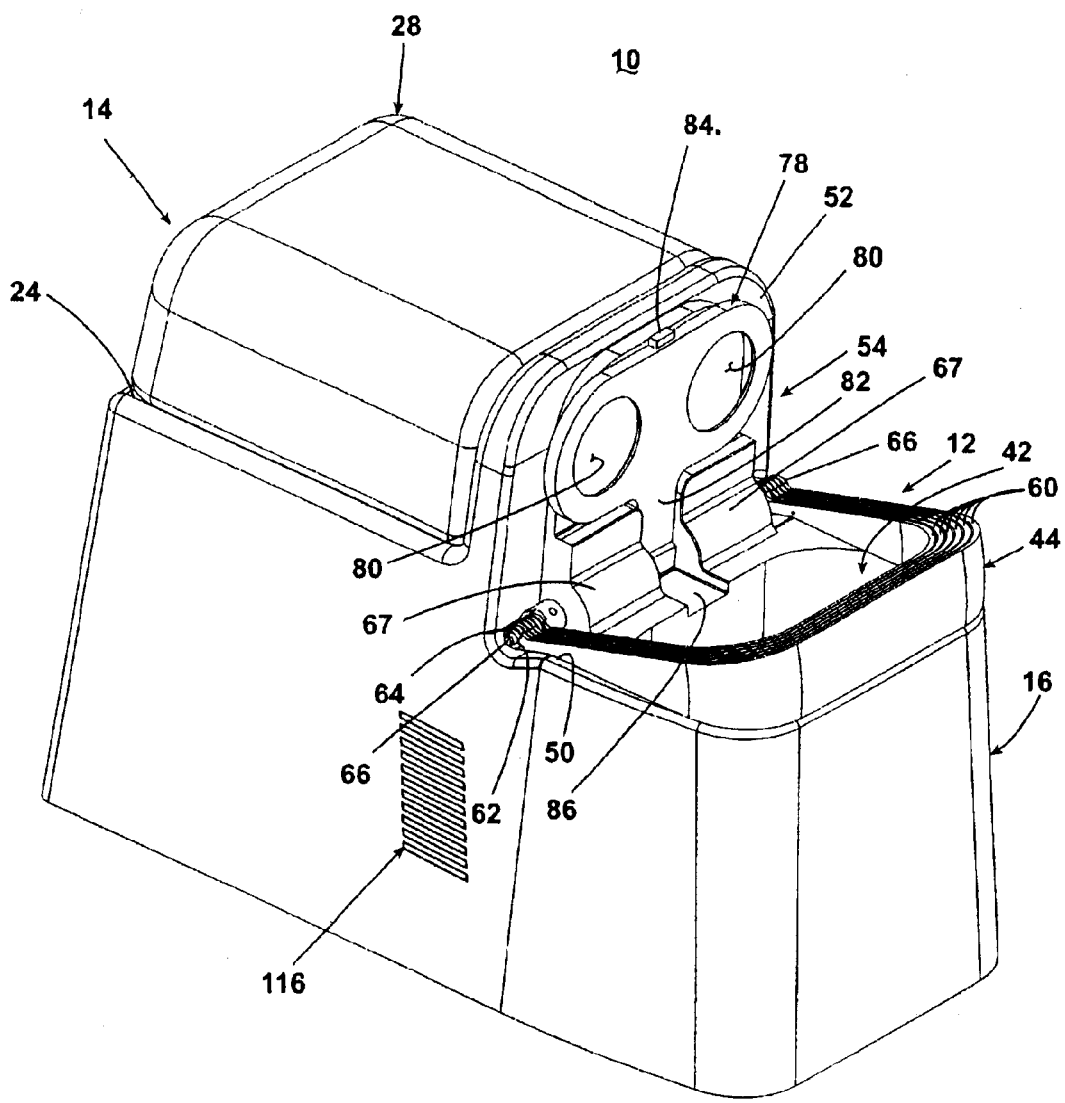
FIG. 1 is a perspective view of a beverage container holder according to the invention shown in the preferred environment of a console suitable for placement within the passenger compartment of a vehicle, with the beverage container holder comprising a chamber for receiving one or more beverage containers, a movably resizing element withdrawn from the chamber, a chamber cover in the open position, and a storage recess with a storage cover in a closed position.

FIG. 1 generally illustrates a console 10 incorporating a thermal conditioning beverage container holder 12 according to the invention in combination with an optional general storage compartment 14. The console 10 comprises a housing 16 in which both the thermal conditioning beverage container holder 12 and the general storage compartment 14 are formed. The console 10 discloses one environment in which the thermal conditioning container holder 12 can be used and should not be considered limiting to the invention.

Referring to FIGS. 1–4 generally and FIG. 5 specifically, the general storage compartment will be described in terms of the housing 16, which comprises a well 20 that defines a storage recess 22 for the general storage compartment 14. The well 20 terminates in an upper lip 24 that defines an opening through which access to the general storage recess 22 is obtained. A cover 28 is movably mounted to the housing 16 to enable the selective closure of the general storage recess 22. It is preferred that the cover 28 be soft or padded so that it may function as an armrest or other support for an occupant in the vehicle.

The thermal conditioning beverage container holder 12 comprises a well 40 defining at least a portion of a chamber 42 for holding a portion of a beverage container and a movable lid 44 for selectively covering the chamber 42. The well 40 is integrally formed with the housing 16 and includes a bottom wall 46 from which extends a peripheral wall 48, which terminates in an outwardly turned lip 50. A portion of the lip 50 transitions into a vertical face 52. The vertical face 52, in combination with the lip 50, defines an access opening 54 in the housing 16 for the well 40, which is selectively closed by movement of the cover 44. The volume bounded by the cover 44 when closed can also be considered part of the chamber 42 as it is subject to the same air flow as the chamber 42.

Figure 2:
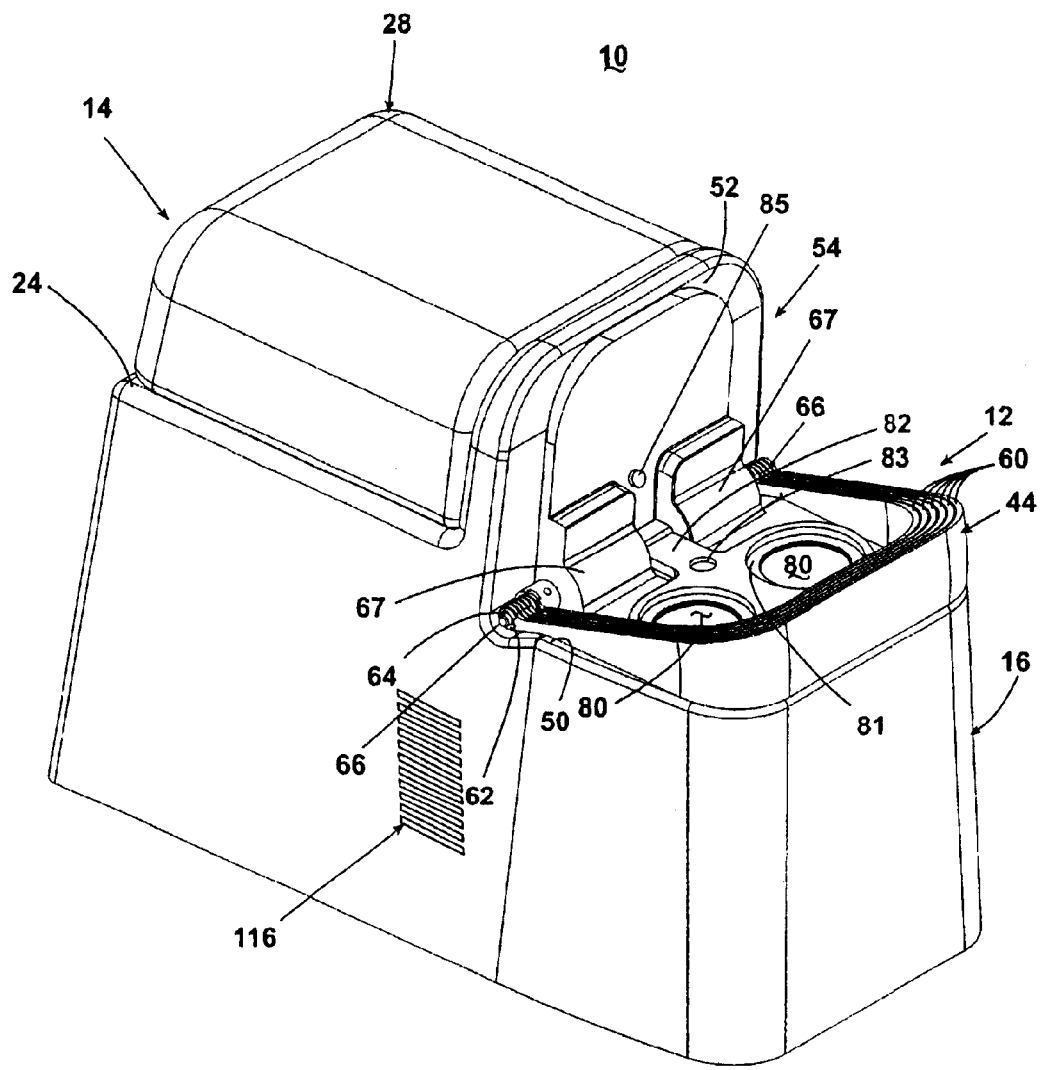
FIG. 2 is a perspective view identical to FIG. 1 except that the resizing element is shown overlying the chamber.
Figure 3:
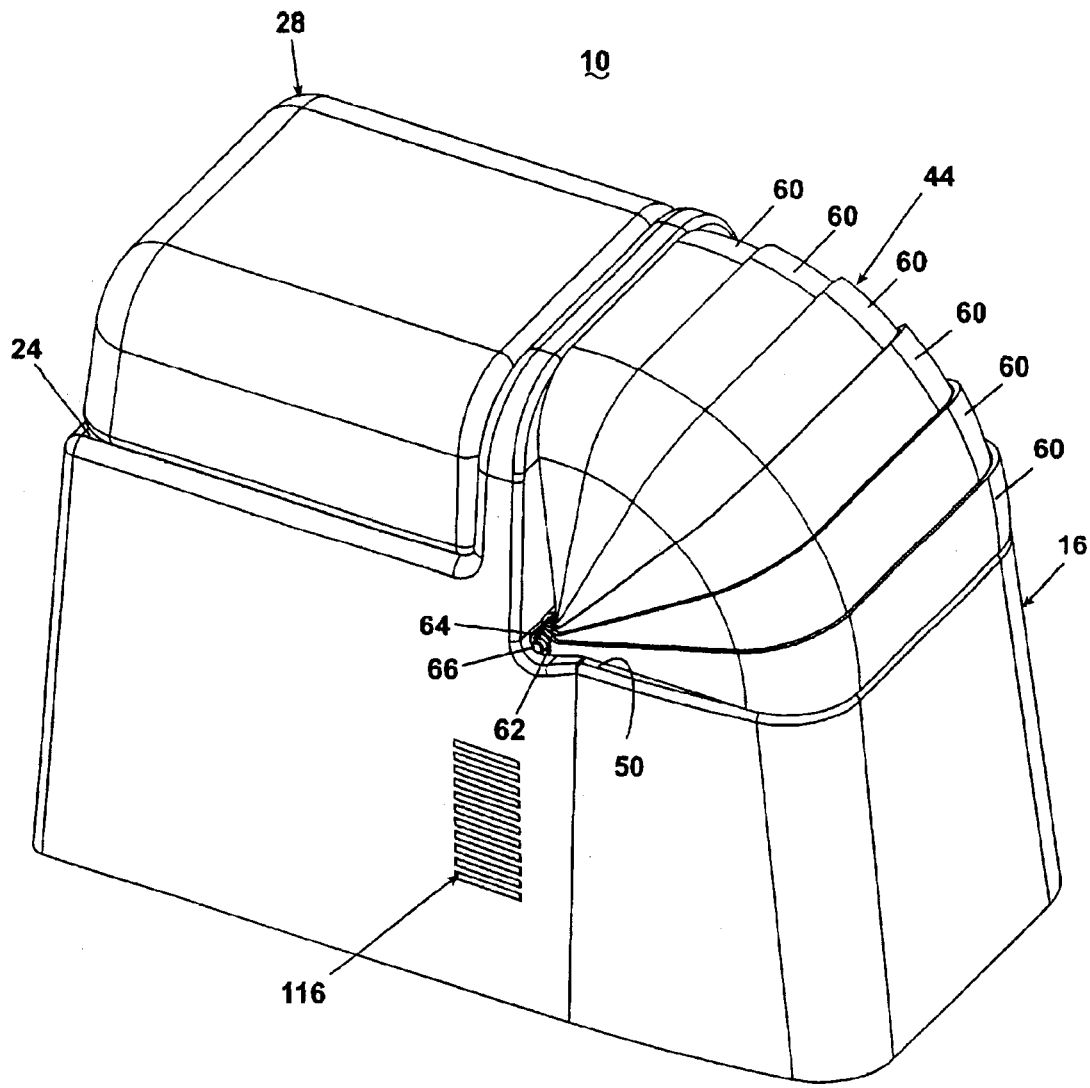
FIG. 3 is a perspective view identical to FIG. 1 except that the cover is shown in the closed position.
Figure 4:
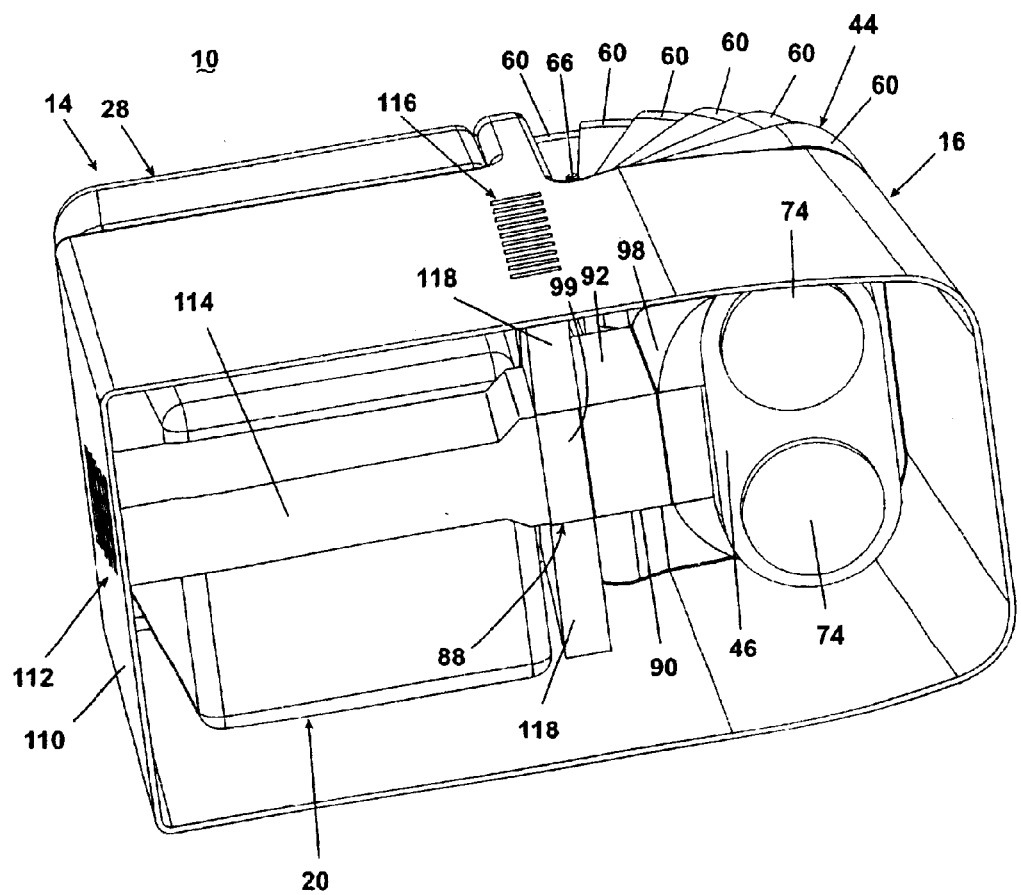
FIG. 4 it is a bottom perspective view of the console of FIG. 1 and illustrating the housing structure forming the chamber and the storage recess, and a convection airflow generator for thermally conditioning air introduced into the chamber.
Figure 5:
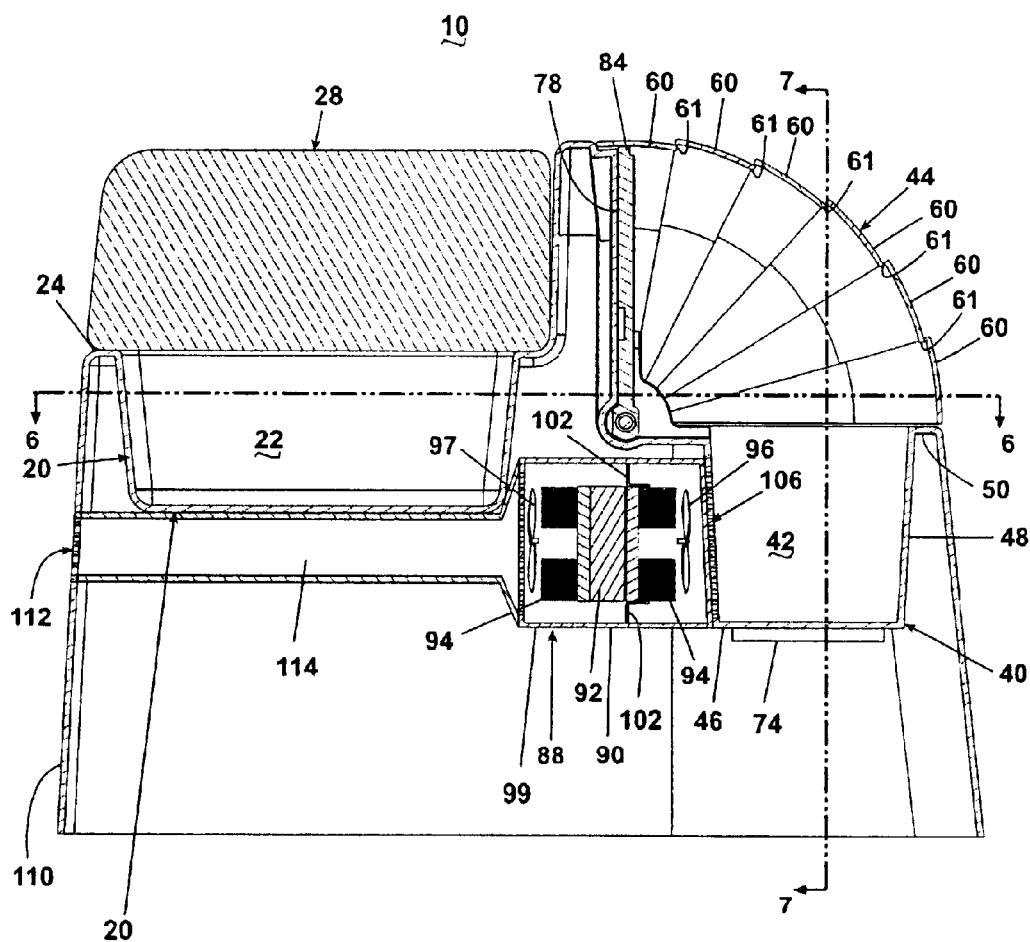
FIG. 5 is a longitudinal sectional view of the console of FIG. 1 and illustrating the relationship between the chamber, storage recess, convection airflow generator, chamber cover, and storage recess cover.

The cover 44 preferably comprises a series of U-shaped segments 60, each of which is of a size to nest relative to each other in the opened position as shown in FIGS. 1 and 2, while still permitting the closure of the access opening 54 as shown in FIGS. 3–5. Each of the U-shaped segments 60 terminates in a pair of hubs 62 in which is formed an opening 64 sized to receive a mounting shaft 66, which is affixed to the housing 16 via spaced shaft mounts 67 integrally formed in the housing 16 at the junction of the lip 50 and the vertical face 52, and which leave the shaft exposed therebetween. A lock washer secured to the mounting shaft 66 prevents the removal of the hub 62 from the mounting shaft 66. Each of the segments 60 can be made from a transparent or translucent material that enables the user to see through the cover 44 and view the contents stored within the chamber 42.

As illustrated, the smallest or innermost of the segments 60 functions as a control segment to affect the movement of all of the segments between the open and closed position. The innermost segment 60 is moved from a position adjacent the lip 50 to a position adjacent the vertical face 52 when moving the cover 44 from the opened position to the closed position. Looking at FIG. 5, each of the segments 60 includes a catch 61 that physically couples with the adjacent segments 60 to ensure that each of the segments 60 sequentially follows the movement of the innermost segment 60 from the closed to the opened position.

Although the cover is illustrated with the smallest segment functioning as the control segment, it is within the scope of the invention for the segments to be arranged such that the largest or outermost segment 60 functions as the control segment. In such a configuration, the user will physically move the outermost segment 60 to effect the movement of the cover between the opened and closed positions.

It is also within the scope of the invention for any other suitable type cover to be used instead of the multi-segmented lid as shown. Other suitable lids would include a single-piece lid, a tambour roll-top lid, or a flexible, collapsible cover for example.

Figure 6:
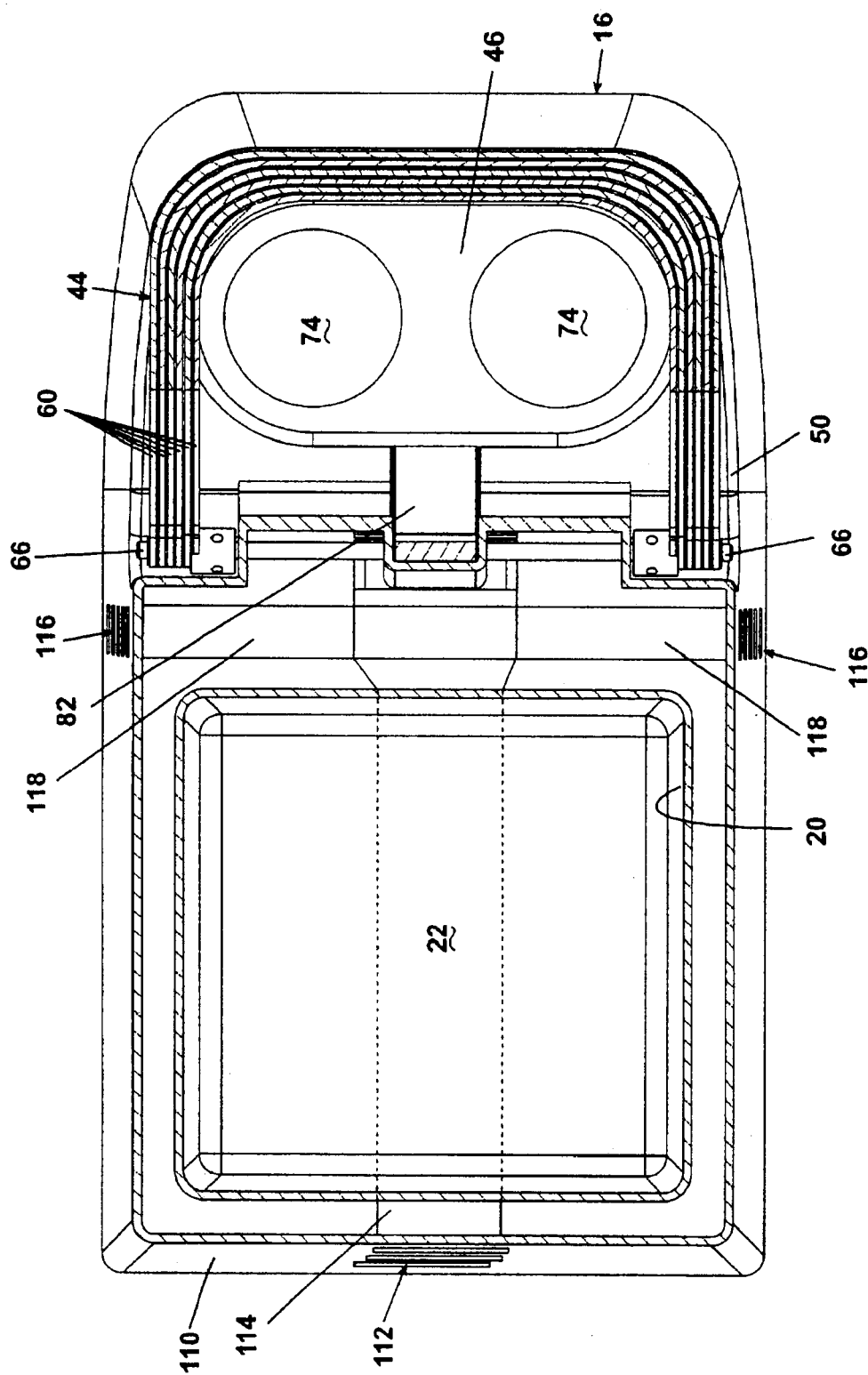
FIG. 6 is a sectional view taken along line 6—6 of FIG. 5 and illustrating the housing structure forming the chamber and the storage recess.

The thermal conditioning beverage container holder 12 further comprises resizing elements used to accommodate various sizes of beverage containers for both differences in the vertical size and in the transverse cross-sectional area size. One resizing element comprises recess 74 formed in the bottom wall 42 of the well 40. As best seen in FIGS. 4–6, the recesses 74 are surrounded by a portion of the bottom wall 46. A beverage container with a base having a larger cross-sectional area can be received on the bottom wall 46 than can be received within the recesses 74. Thus, the recesses 74 in the bottom wall 46 function as resizing elements. Moreover, the nature of the recesses 74, in that they will receive a portion of the beverage container base within the recess, aid in stabilizing the beverage container. Beverage containers too large in size for their bottom to be received within the recesses 74 will naturally be stabilized by the peripheral wall 48 surrounding the bottom wall 46.

It is within the scope of the invention for the recesses 74 to comprise multiple or nested recesses, with each smaller recess preferably located within the circumference of a larger recess and having a slightly greater depth. The shape of such nesting recesses would have a stair step profile at its outer ends.

A second resizing element is a movable support plate 78 in which are formed multiple openings 80. Each opening 80 is countersunk with a recessed surface 81 having a diameter larger than the diameter of the opening 80. The support plate 78 includes a finger 82 having an opening through which the shaft 66 is slidably received to thereby pivotally mount the plate 78 to the housing 16 and permit the movement of the plate 78 between a withdrawn position as illustrated in FIG. 1, where the movable plate does not overlie the chamber 42, and a use position, where the movable plate 78 overlies the chamber 42 as shown in FIG. 2. In the withdrawn position, the movable plate 78 is preferably located adjacent the vertical face 52. A catch 83 on the finger 82 interacts with a latch 85 on the vertical face 52 to hold the movable plate 78 in the withdrawn position. Preferably, the catch 83 and latch 85 will be a hook and loop fastener. In the use position, the movable plate 78 overlies the chamber 42 such that the plate openings 80 are located within the interior of the chamber 42 and spaced from the bottom wall 46.

The plate 78 can also include a stop 84 that abuts the lip 50 when the plate 78 is in the use position to effectively stop the movement of the plate and fix the plate in the use position. Similarly, the finger 82 is received within a channel 86 in the lip 50 to also limit the continued rotation of the plate 78 from the withdrawn position to the use position.

The plate openings 80 preferably have a smaller area than the recesses 74 formed in the bottom wall 46 so that the plate 78 can be used to accommodate even smaller-size cups than the recesses 74. Unlike the recesses 74 in the bottom wall 46, the openings 80 are sized to support beverage containers not by supporting the bottom of the container but by supporting the sidewall of the container after the base has been inserted through the plate openings 80. Because of this structure, beverage containers supported by the plate 78 will be held higher within the chamber 42 than beverage containers supported by the bottom wall 46.

Also, the recessed surfaces 81 will permit shorter cups such as coffee mugs with handles to be supported thereon, over the opening 80. This configuration enables such a cup to be easily grasped without having to reach into the well 40.

It should be noted that the recesses 74 could be openings like the openings 80 in the plate 78. However, to prevent the high loss of conditioned air from the chamber 42, it is preferred that the bottom wall 46 use recesses instead of openings.

Referring to FIGS. 5–8, the thermal conditioning container holder 12 further comprises a convection airflow generator 88 comprising thermal conditioner 90 and a blower for circulating the thermally conditioned air. The convection airflow generator 88 is in fluid communication with the chamber 42 to supply conditioned air to the chamber 42 to help control the temperature of a beverage in the beverage container. It is preferred that the thermal conditioner 90 be capable of thermally conditioning the air by either heating or cooling the air as desired. However, it is within the scope of the invention for the thermal conditioner 90 to thermally condition the air by only heating or cooling, not both.

Figure 7:
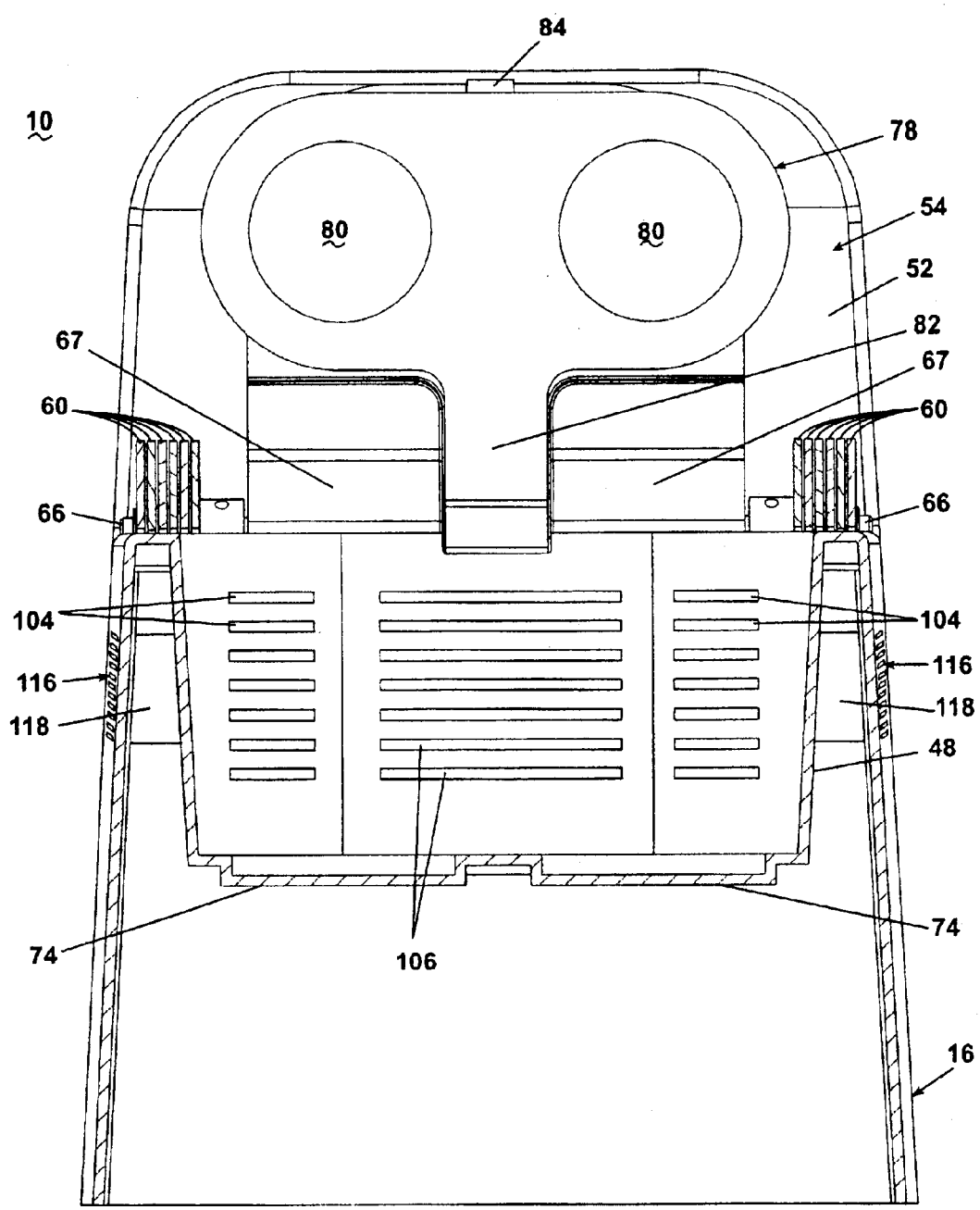
FIG. 7 is a sectional view taken along line 7—7 of FIG. 5 except the chamber cover is shown in the open position to better illustrate the resizing element in the withdrawn position.
Figure 8:
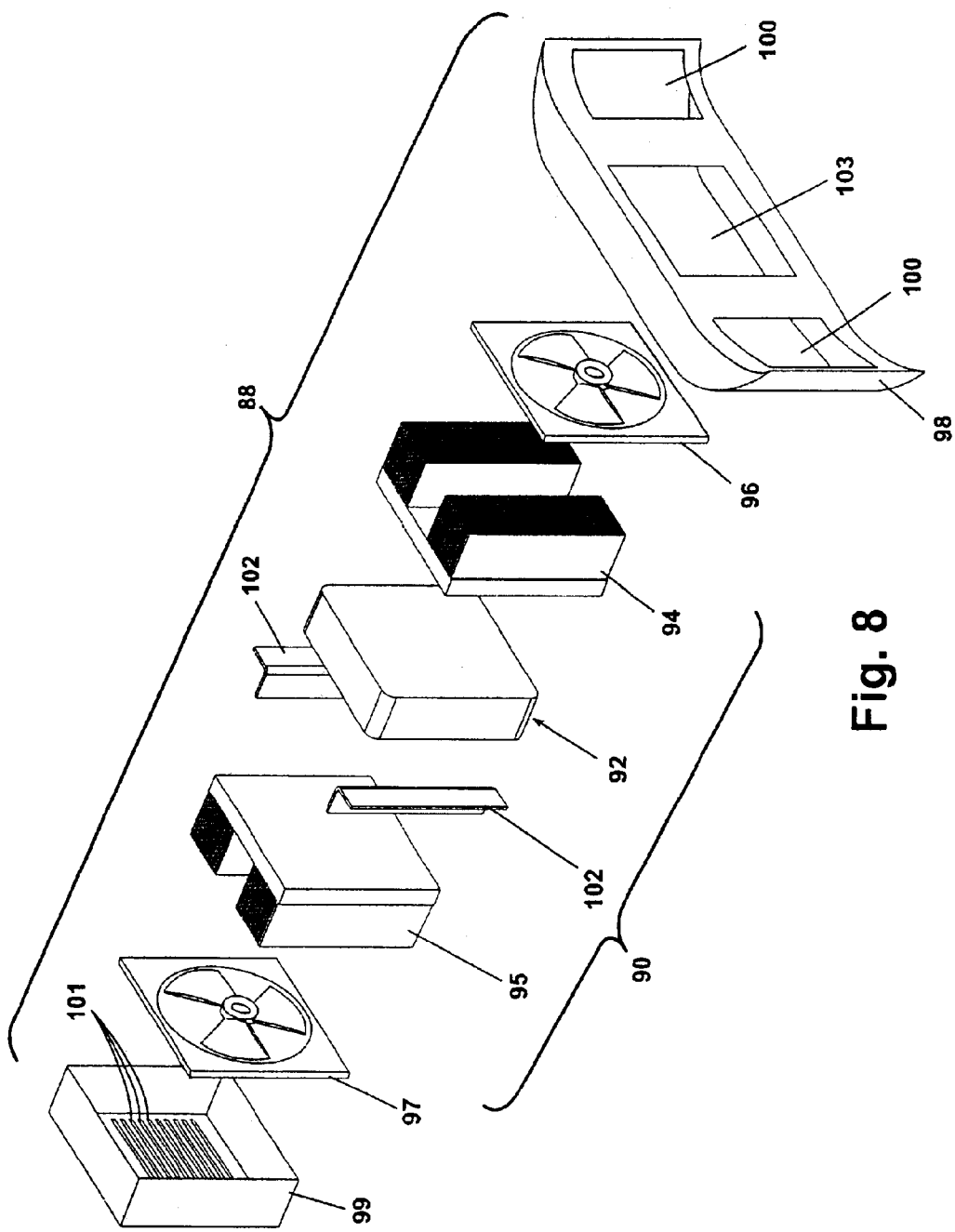
FIG. 8 is an exploded view of the convection airflow generator shown in FIG. 4.

As generally illustrated in FIGS. 5–7 and specifically shown in FIG. 8, the preferred form of the thermal conditioner 90 is a thermoelectric device, which for this embodiment is the simplest contained unit. Such thermoelectric devices are well known and will not be described in detail since their construction and operation are well known. Super Cool AB of Sweden manufactures thermoelectric devices suitable for the invention. In general, the thermoelectric device comprises a thermoelectric element 92 having a traditional bicomponent structure, with heat sinks 94, 95 mounted on either side of the thermoelectric element 92.

A blower in the form of corresponding fans 96, 97 is mounted to each of the heat sinks 94, 95, respectively. The thermoelectric device and the fans 96, 97 are contained within a housing comprising first and second halves 98, 99 each of which includes outlets 100. Brackets 102 mount the thermoelectric element 92 to one of the housing halves 98, 99. Depending on the direction of the current flow through the thermoelectric element 92, one of the heat sinks 94, 95 will be cooled and the other will be heated. The fans 96, 97 will circulate air over the heat sinks 94, 95. The housing 98 also includes an inlet opening 103 intermediate the outlets 100, 101.

The housing 98 is disposed between the thermoelectric device and the peripheral wall 48. The outlets 100 in the housing 98 are aligned with corresponding supply vents 104 in the peripheral wall 48 of the well 40, and the inlet opening 103 is aligned with corresponding return vents 106 in the peripheral wall 48. This structure establishes fluid communication between the thermal conditioner 90 and the chamber 42. The fan 96 is preferably arranged or a baffle is employed to create a recirculating airflow path between the thermal conditioner 90 and the chamber 42, whereby the fan 96 draws air from the chamber 42 through the return air vents 106 to be conditioned by the thermal conditioner 90. The conditioned air is then supplied to the chamber through the supply vents 104. The direction of travel of the recirculating airflow is immaterial.

In a similar manner, air is directed to and away from the other side of the thermal conditioner 90. Looking at FIGS. 1–6, a back wall 110 of the housing 16 has a series of inlet openings 112. A conduit 114 runs from the inlets openings 112, beneath the general storage recess 22 to the fan second housing half 99 from which the fan 97 draws air and directs it toward the heat sink 95. Air from the heat sink 95 is then expelled to atmosphere through exhaust vents 116 in the side of the housing 16. The exhaust air may be conducted by way of side conduits 118 extending between the thermal conditioner 90 and the exhaust vents 116.

The thermal conditioner 90 can thus be used to heat or cool the chamber 42 by convection in that the thermoelectric element 92 can heat or cool the heat sink 94 to condition the temperature of the air surrounding the heat sink 94, and the fan 96 introduces the conditioned air into the chamber 42. The thermal conditioner 90, in combination with the fan 96, forms the convection air flow generator 88.

Other types of convection air flow generators can be used. For example, a traditional refrigeration circuit comprising a compressor, evaporator, and condenser in combination with a heating element can form the thermal conditioner of an alternative convection air flow generator. A fan can be used to force the air into the chamber 42 in the same manner as described above. Additionally, the HVAC system of the vehicle can be used to supply the conditioned air. Although the stand-alone refrigeration unit in combination with a heating element and the HVAC system can technically be used as part of or complete alternatives to the convection flow generator of the invention, they are not preferred and are not highly desirable, self-containment and compactness is valued over cooling performance. Each has disadvantages as compared to the thermoelectric device. Most notably, the thermoelectric device is self-contained and compact, easily fitting into the interior of the console. It does not require all of the moving parts of the stand-alone refrigeration system, nor does it require the special ducting that the vehicle HVAC system would need to supply the chamber 42. The vehicle HVAC system is also limited in that it can only supply hot or cold air as required by the passenger in the vehicle, which may not be what is needed for the beverage. For example, if a cold drink is placed in the beverage container holder and it is wintertime, the passenger is likely to have the HVAC emitting heated air, which will warm the beverage, not keep it chilled.

Figure 9:
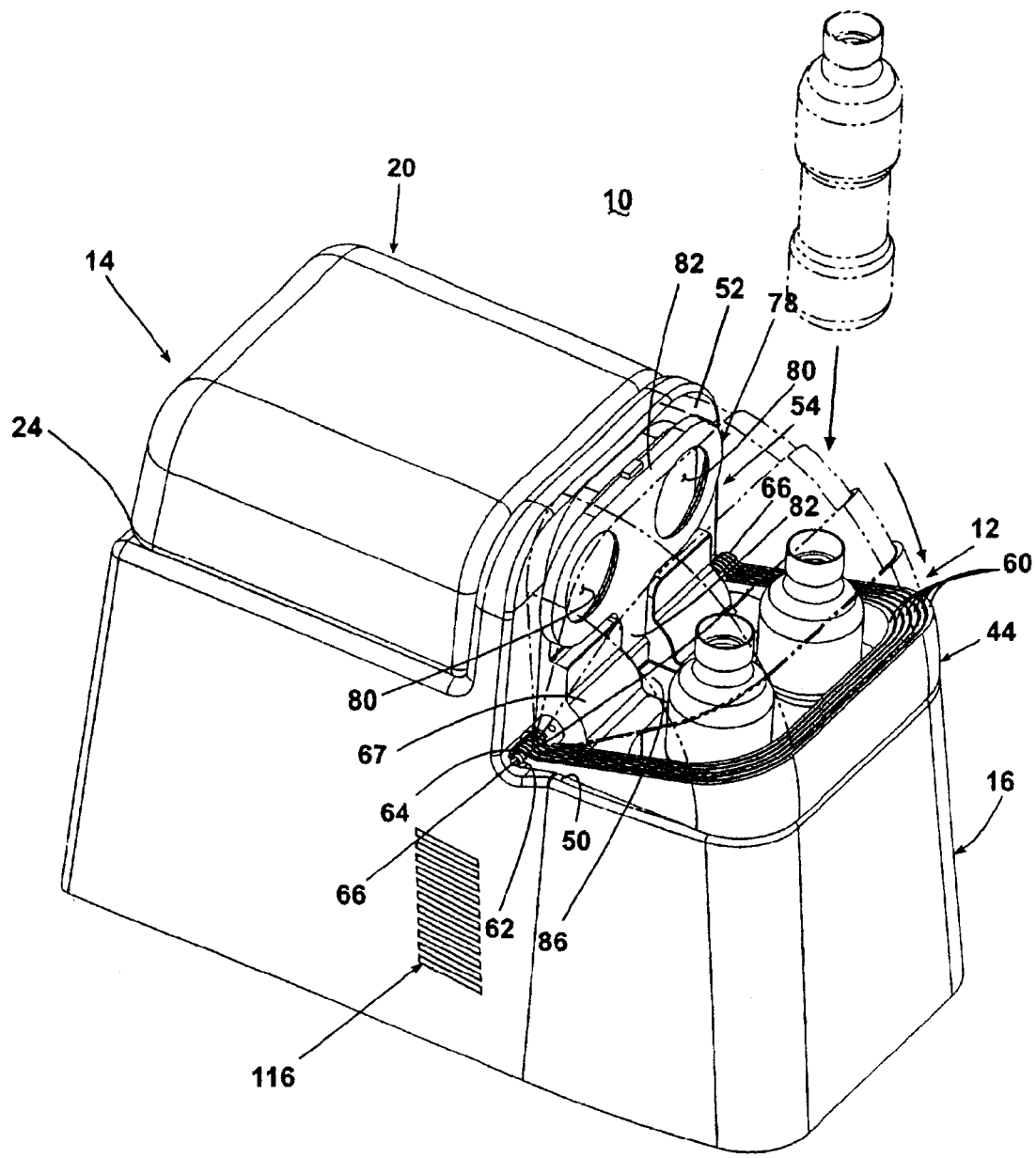
FIG. 9 is a perspective view similar to FIG. 1 and illustrating the placement of a bottle-type beverage container into the beverage container holder according to the invention.

The operation of the container holder 12 will be described with reference to FIG. 9. In operation, the user initially moves the cover 44 to the open position, if it is not already in the open position. The user will then adjust the beverage container holder to accommodate the desired beverage container size. For example, if the user is going to place a straight-walled bottle of the type commonly used for water or sports drinks in the container holder 12, the user will typically move the plate 78 to the withdrawn position and place the bottle within the chamber 42 until the bottom of the bottle abuts the bottom wall 46 of the well 40.

The depth of the chamber 42 as defined by the well 40 is sufficient to maintain such bottles, and most containers for that matter, in a stable position. If the transverse cross-sectional area of the bottle is small enough to be received within the recess 74, the bottom of the bottle will so be received, thereby further stabilizing the bottle. If the bottom of the bottle is too large to be received within the recess 74, the bottle bottom will naturally rest on the bottom wall 46.

If the bottle has a transverse cross-sectional area that can be received through the openings 80 in the plate 78, the user need not move the plate 78 to the withdrawn position. Instead, the user can move the plate 78 to the use position and insert the bottle through one of the openings 80, which will further stabilize the bottle. This is especially useful for many bottles used for water and sports drinks, which tend to have a much greater height and a smaller transverse cross-sectional area than a traditional cup, rendering them more likely to tip over.

It should be noted that this description of the insertion of a bottle into the cup holder 12 also applies to any other type of beverage container, including a tapered cup, to the extent the beverage container can fit within the chamber 42 or through the plate openings 80 as described.

Assuming the beverage in the bottle is of the type that is typically served chilled, the thermal conditioner 90 will be operated to convect chilled air to the chamber 42 to control the temperature of the beverage in the bottle in a chilled condition.

It is preferred that the user maintain the cover 44 in the closed position when access is not needed to the beverage container since the closed cover will enhance the efficiency of the thermal conditioner 90 by maintaining the chilled air within the chamber 42.

While no controller is disclosed for controlling the operation of the thermal conditioner, including the heating or cooling setting along with the starting and stopping of the thermal conditioner 90, it is contemplated that a simple controller permitting at least the control of the heating or cooling mode will be provided. The user interface for such a controller can be located on the console or on the dashboard of the vehicle. The type of controller and its location is not germane to the invention. Suitable controllers already exist or are easily designed. For example, a controller suitable for the invention is a double pole, double throw, polarity reversing switch from Eaton Corporation of the type commonly used in automotive applications.

Figure 10:
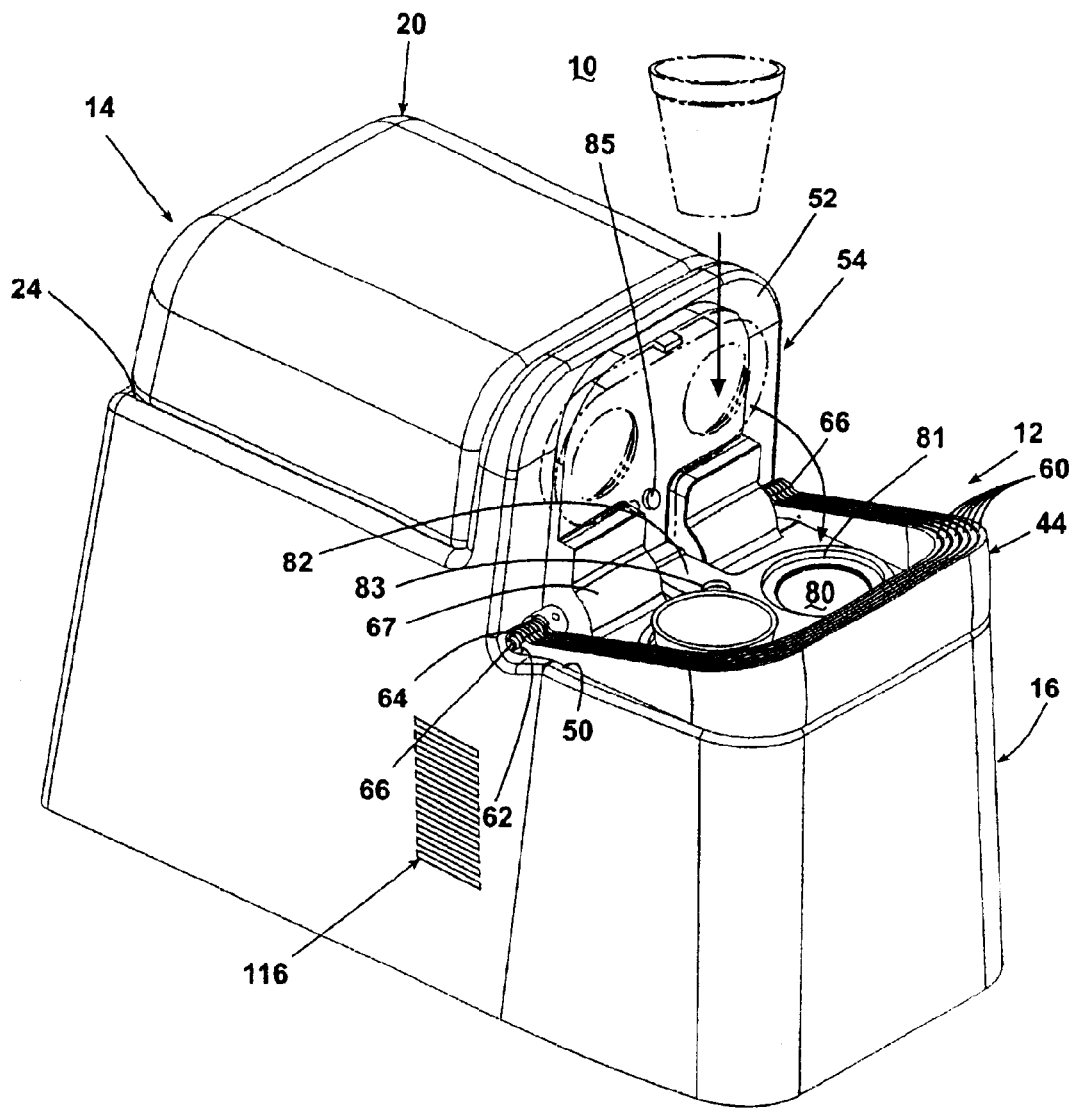
FIG. 10 is a perspective view similar to FIG. 2 and illustrating the placement of a cup-type beverage container into the beverage container holder according to the invention.

FIG. 10 illustrates the operation of the container holder 12 when used to hold a cup, typically of the tapered variety, which is normally used to hold heated beverages, such as coffees and the like. These types of beverage containers are generally tapered and have a short height. While these types of cups could be placed directly in the chamber 42 in the same manner described for the bottle, it is anticipated that the depth of the chamber 42 will be sufficient that it will be difficult for the user to insert and remove the cup from the chamber 42. Therefore, it is contemplated that when using such smaller cups, the user will prefer to have the cups supported by the plate 78 instead of placing the cups within the chamber 42.

To support the cup as described, the user will move the plate 78 into the use position, if it is already not in the use position. The user will then insert the bottom portion of the cup into one of the plate openings 80 until the sidewalls of the cup rest against the end of the plate 78 defining the openings 80. As can be seen in FIG. 10, in this position, a lower portion of the cup is received within the chamber 42 and the upper portion of the cup extends above the plate 78. The user can then close the cover 44.

For the traditional cups, it is also preferred that the cover 44 is kept closed when access is not needed to the cup. This is especially true when the cup contains a beverage that is typically served heated. Since heated air will be convected into the chamber 42 for a hot beverage, the heated air, which will naturally rise, will tend to escape from the chamber 42 when the cover is in the opened position. Maintaining the cover in the closed position will enhance the efficiency of the thermal conditioner 90 and its ability to maintain the temperature of the beverage as desired.

The invention takes advantage of the tendency of heated air to rise and the likelihood that heated beverages are generally served in smaller cups by locating the plate 78 at an elevated position relative to the chamber 42. By so positioning the plate 78, the cups of an appropriate size to fit within the plate openings 80 are maintained in an elevated position where the rising heated air will tend to collect when the cover is closed. Thus, the portion of the housing between the chamber 42 and the cover 44 in the closed position effectively becomes part of the chamber 42 and is also treated with thermally conditioned air.

While the invention has been specifically described in connection with certain specific embodiments thereof, it is to be understood that this is by way of illustration and not of limitation, and the scope of the appended claims should be construed as broadly as the prior art will permit.

What is claimed is:

1. A thermal conditioning beverage container holder comprising:
    a housing defining a chamber sized to receive a beverage container and having an access opening permitting access to the chamber through the housing;
    a movable cover comprising multiple segments movably mounted to the housing and being movable between an opened position and a closed position for selectively closing the access opening;
    a convection airflow generator fluidly coupled to the chamber and delivering thermally conditioned air to the chamber; and
    a size-adjustable beverage holder located within the chamber to enable the supporting of cups of differing sizes.

2. The thermal conditioning beverage container holder according to claim 1, wherein the multiple segments telescopically nest when in the opened position.

3. The thermal conditioning cup holder according to claim 1, wherein the housing defines at least one of a vehicle dashboard, vehicle armrest, and glove box.

4. A thermal conditioning cup holder comprising:
    a housing defining a chamber sized to receive a beverage container and having an access opening permitting access to the chamber through the housing;
    a convection airflow generator fluidly coupled to the chamber and delivering thermally conditioned air to the chamber;

a size-adjustable beverage holder located within the chamber to enable the supporting of cups of differing sizes;

a beverage container support located within the chamber and sized to support a bottom portion of the beverage container, the beverage container support comprising a first recess for receiving the bottom of a beverage container up to a first maximum diameter and a second recess greater in size than the first recess for receiving the bottom of a beverage container of a second maximum diameter that is larger than the first maximum diameter.

5. The thermal conditioning cup holder according to claim 4, wherein the first and second recesses are coaxial.

6. A thermal conditioning cup holder comprising:

a housing defining a chamber sized to receive a beverage container and having an access opening permitting access to the chamber through the housing;

a convection airflow generator fluidly coupled to the chamber and delivering thermally conditioned air to the chamber; a size-adjustable beverage holder located within the chamber to enable the supporting of cups of differing sizes;

a beverage container support located within the chamber and sized to support a bottom portion of the beverage container, and a resizing element removably mounted within the chamber for reducing the size of the beverage container that can be received within the chamber when the resizing element is mounted within the chamber, the resizing element comprising a plate in which is formed an opening for receiving a beverage container and movable between a first position, where the plate overlies the chamber to reduce the effective cross-sectional area of the chamber, and a second position, where the plate is withdrawn from the overlying relationship to the chamber, the resizing element reducing the effective cross-sectional area of the chamber which reduces the circumference of the beverage container receivable within the chamber.

7. The thermal conditioning cup holder according to claim 6, wherein the resizing element reduces the effective depth of the chamber to reduce the height of the beverage container receivable within the chamber.

8. The thermal conditioning cup holder according to claim 6, wherein the plate is spaced above the container support when the plate is in the first position.

9. The thermal conditioning cup holder according to claim 8, wherein the container support is part of the housing and forms the bottom of the chamber, and the housing further comprises a peripheral sidewall extending upwardly from the container support and terminating in an upper lip that defines a chamber opening, which is accessible through the access opening.

10. The thermal conditioning cup holder according to claim 9, wherein the plate is pivotally mounted to the upper lip wherein when the plate is in the first position, the plate overlies the chamber opening.

11. The thermal conditioning cup holder according to claim 10, wherein the chamber is sized to receive at least two beverage containers and the plate has at least two openings.

12. The thermal conditioning cup holder according to claim 11, wherein the container support comprises a first recess for receiving the bottom of the beverage container up to a first maximum diameter.

13. The thermal conditioning cup holder according to claim 12, wherein the container support comprises a second recess greater in size than the first recess for receiving the bottom of a beverage container of a second maximum diameter that is larger than the first maximum diameter.

14. The thermal conditioning cup holder according to claim 13, wherein the first and second recesses are coaxial.

15. The thermal conditioning cup holder according to claims 9, wherein the peripheral sidewall has an inlet fluidly coupled to the convection airflow generator through which conditioned air is delivered into the chamber.

16. The thermal conditioning cup holder according to claim 15, wherein the peripheral sidewall has an outlet fluidly coupled to the convection airflow generator through which conditioned air is exhausted to the convection airflow generator to recirculate conditioned air into the chamber.

17. The thermal conditioning cup holder according to claim 15, wherein the convection airflow generator comprises a thermal conditioner for conditioning air by altering its temperature, and a blower for blowing the conditioned air into the chamber.

18. The thermal conditioning cup holder according to claim 17, wherein the thermal conditioner increases or decreases the temperature of air in the chamber from the ambient temperature of the air exterior of the housing.

19. The thermal conditioning cup holder according to claim 17, wherein the thermal conditioner is a thermoelectric device.

20. The thermal conditioning cup holder according to claim 17, wherein the thermal conditioner comprises a refrigeration unit.

21. The thermal conditioning cup holder according to claim 20, wherein the thermal conditioner comprises a heating unit.

22. The thermal conditioning cup holder according to claim 17, wherein the thermal conditioner is mounted to the peripheral wall.

23. The thermal conditioning cup holder according to claim 6, wherein the resizing element also reduces the effective depth of the chamber to reduce the height of the beverage container receivable within the chamber.

24. A thermal conditioning cup holder comprising:

a housing defining a console having at least one storage chamber and defining a chamber sized to receive a beverage container and having an access opening permitting access to the chamber through the housing; the console being sized to fit between the front seats of a motor vehicle;

a convection airflow generator fluidly coupled to the chamber and delivering thermally conditioned air to the chamber; and a size-adjustable beverage holder located within the chamber to enable the supporting of cups of differing sizes.

25. The thermal conditioning cup holder according to claim 24, wherein the console further comprises a storage chamber cover for selectively covering the storage chamber.

26. A thermal conditioning cup holder comprising:

a housing comprising a support wall and defining a chamber sized to receive a beverage container and having an access opening permitting access to the chamber through the housing;

a convection airflow generator fluidly coupled to the chamber and delivering thermally conditioned air to the chamber; the convection airflow generator comprising a thermal conditioner for conditioning the air by altering the temperature, and a blower for recirculating the conditioned air through the chamber; the thermal conditioner being a thermoelectric device which comprises a thermoelectric element and first and second heat sinks; the thermal electric element being mounted on the support wall and the first heat sink protecting away from one side of the support wall and the second heat sink projecting away from the other side of the wall and in fluid communication with the chamber; and a size-adjustable beverage holder located within the chamber to enable the supporting of cups of differing sizes.

27. The thermal conditioning cup holder according to claim 26, wherein the thermal conditioner increases or decreases the air temperature inside the housing relative to the temperature of the ambient air exterior of the housing.

28. The thermal conditioning cup holder according to claim 26, wherein the blower is a fan located in the housing on the other side of the support wall.

29. The thermal conditioning cup holder according to claim 28, wherein the housing comprises a peripheral wall defining the sides of the chamber, and the peripheral wall is spaced from the support wall such that the second heat sink and blower are located in the space between the support and peripheral walls.

30. The thermal conditioning cup holder according to claim 26, wherein the thermal conditioner comprises a refrigeration unit.

31. The thermal conditioning cup holder according to claim 26, wherein the thermal conditioner comprises a heating unit.

32. A reclosable cup holder comprising:

a housing defining a cup-receiving chamber having an access opening through which a cup can be inserted or removed;

a cup holder located within the chamber for supporting a cup placed within the chamber; and a see-through cover movably mounted to the housing for movement between a closed position, where the cover closes the access opening, and an opened position, where the cover is removed from the access opening; the movable cover further comprising multiple segments movably mounted to the housing.

33. The reclosable cup holder according to claim 32, wherein the multiple segments telescopically nest when in the opened position.

34. A reclosable cup holder comprising:

a housing defining a cup-receiving chamber having an access opening through which a cup can be inserted or removed;

a cup holder located within the chamber for supporting a cup placed within the chamber;

a cup support located within the chamber and sized to support a bottom portion of the cup;

a resizing element removably mounted within the chamber for reducing the size of the cup that can be received within the chamber when the resizing element is mounted within the chamber, the resizing element comprising a plate in which is formed an opening for receiving a cup and movable between a first position, where the plate extends into the chamber to reduce the effective cross-sectional area of the chamber, and a second position, where the plate is withdrawn from the chamber, the resizing element reducing the effective cross-sectional area of the chamber which reduces the circumference of the cup receivable within the chamber and also reduces the effective depth of the chamber which reduces the height of the cup receivable within the chamber; and a see-through cover movably mounted to the housing for movement between a closed position, where the cover closes the access opening, and an opened position, where the cover is removed from the access opening.

35. The reclosable cup holder according to claim 34, wherein the resizing element reduces the effective depth of the chamber to reduce the height of the cup receivable within the chamber.

36. A method for controlling the temperature of a beverage held by a beverage container temporarily stored in a size-adjustable beverage holder located within a chamber of a housing in a motor vehicle, the method comprising:

adjusting the size of the size-adjustable beverage holder to accommodate the beverage container to be placed in the chamber by altering the effective cross-sectional area of the chamber by introducing within the chamber a plate having at least one opening with a cross-sectional area less that the cross-sectional area of the chamber and the cup being received within the opening;

placing the beverage container in the size-adjustable beverage holder; and introducing thermally conditioned air into the chamber to control the temperature of the beverage in the beverage container at a temperature above or below the ambient air temperature within the vehicle interior.

37. The method according to claim 36, wherein the step of adjusting the size of the size-adjustable beverage holder comprises altering the effective depth of the chamber.

38. The method according to claim 37, wherein the step of altering the effective depth of the chamber comprises reducing the effective depth of the chamber.

39. The method according to claim 36, wherein the thermally conditioned air is recirculated through the chamber.

40. The method according to claim 39, and further comprising fluidly separating the chamber from the ambient air surrounding the housing.

41. The method according to claim 40, wherein the step of fluidly separating the chamber includes placing a cover over the chamber.

* * * * *